United States Patent [19]
Kaplan

[11] Patent Number: 6,111,862
[45] Date of Patent: Aug. 29, 2000

[54] IDLE CODE DENSITY DETECTOR

[75] Inventor: Thomas M. Kaplan, Allen, Tex.

[73] Assignee: Alcatel USA Sourcing, L.P., Plano, Tex.

[21] Appl. No.: 08/879,844

[22] Filed: Jun. 19, 1997

[51] Int. Cl.[7] .............................. H04B 3/20; H04M 1/00
[52] U.S. Cl. ........................................... 370/287; 379/407
[58] Field of Search .................................. 370/286, 287, 370/289, 290, 522, 252, 291–292; 379/406, 407, 410, 411, 106

[56] References Cited

U.S. PATENT DOCUMENTS

| | | | |
|---|---|---|---|
| 5,235,634 | 8/1993 | Oliver | 379/106 |
| 5,361,251 | 11/1994 | Aihara et al. | 370/252 |

*Primary Examiner*—Chi H. Pham
*Assistant Examiner*—Maikhanh Tran
*Attorney, Agent, or Firm*—Baker Botts L.L.P.

[57] ABSTRACT

An echo canceler (10) includes an idle code density detector (12) that measures an idle code density over a period of time. The idle code density detector (12) includes an idle code detector (30) that identifies idle codes and non-idle codes. An idle code integrator (32) increments an idle code count (36) by a first weight factor (38) for each idle code identified by the idle code detector (30). The idle code integrator (32) decrements the idle code count (36) by a second weight factor (40) for each non-idle code identified by the idle code detector (30). A threshold detector (34) continuously compares the idle code count (36) to a threshold value (42). When the idle code count (36) exceeds the threshold value (42), the threshold detector (34) generates a control signal (22) to disable an adaptive filter (14) and a processor (18) of the echo canceler (10).

15 Claims, 1 Drawing Sheet

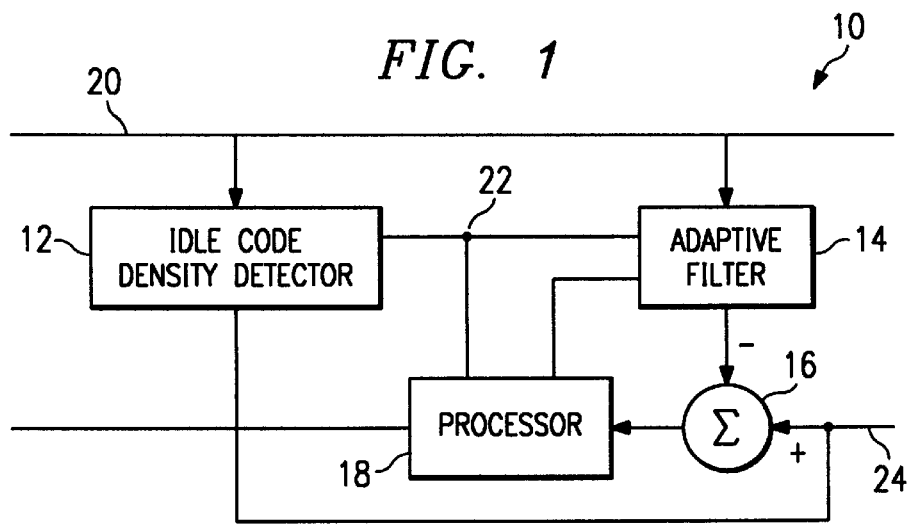
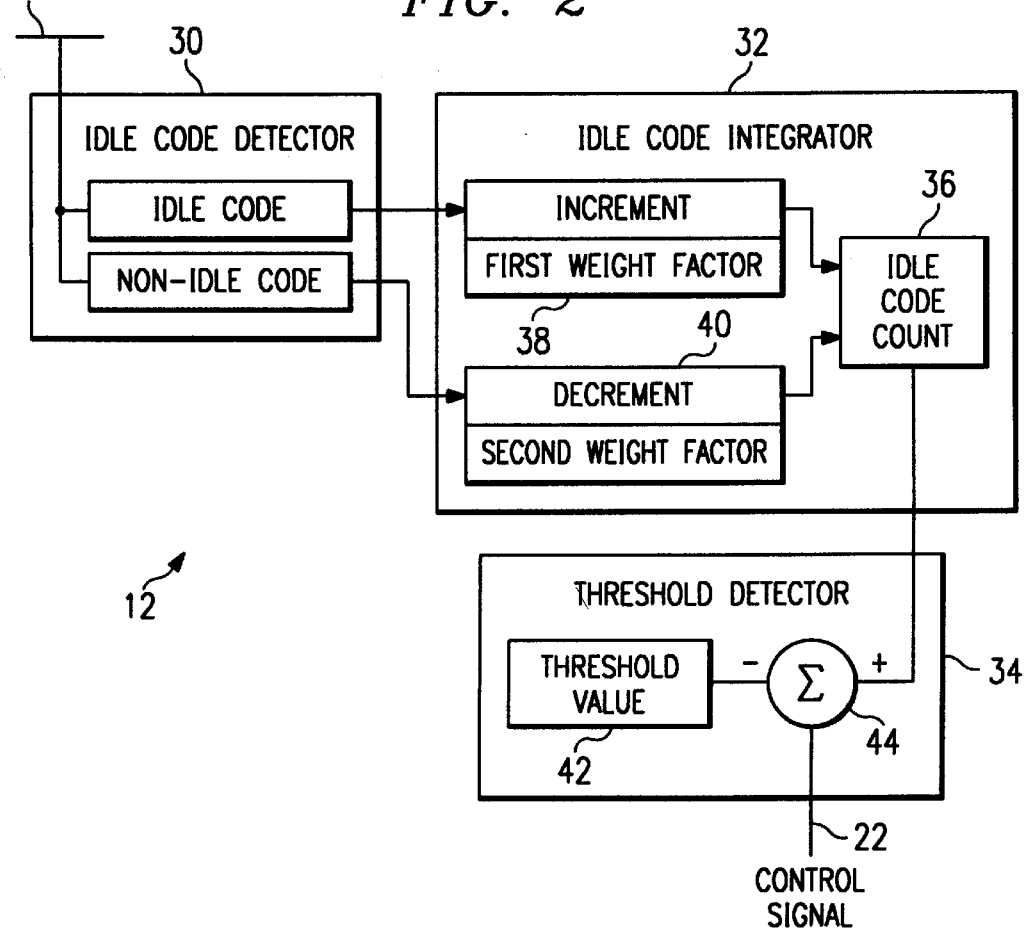

IDLE CODE DENSITY DETECTOR

TECHNICAL FIELD OF THE INVENTION

The present invention relates in general to telecommunications signal processing and more particularly to an idle code density detector.

BACKGROUND OF THE INVENTION

In SS-7 or Clear Channel signaling networks, idle codes are issued by a central office switch over inter-machine trunks to indicate no connection or no voice frequency energy present. Since no signaling bits are available in SS-7 or Clear Channel signaling networks, idle codes are used by an echo canceler to detect off-hook and end of call conditions. However, when the inter-machine trunk is not in an idle state, i.e. such as when an off-hook condition exists, but the input line of the trunk has no voice frequency energy present, idle codes are interspersed with quiet/low noise and other non-idle codes. Typically, idle codes differ from non-idle codes by only the least significant bit. Conventional echo cancelers typically detect for idle codes only and, thus, false detection may occur on non-idle silent lines to force the echo canceler to re-enable.

An example of false detection and undesirable re-enable of the echo canceler may occur during facsimile data transmission when multiple pages are sent. During inter-page gaps, idle codes are interspersed with the non-idle codes. The echo canceler will detect the idle codes and re-enable, resulting in interference with the facsimile data transmission. Similar circumstances may occur during half duplex low speed modem data transfers. Therefore, it is desirable to have an echo canceler that does not falsely detect idle codes during non-idle operation.

SUMMARY OF THE INVENTION

From the foregoing, it may be appreciated that a need has arisen for an echo canceler to accurately detect for proper idle code presence without falsely detecting idle codes during non-idle operation. In accordance with the present invention, an idle code density detector and method are provided that substantially eliminate or reduce disadvantages and problems associated with conventional echo cancelers.

According to an embodiment of the present invention, there is provided an idle code density detector that includes an idle code detector operable to identify idle codes on an input line. An idle code integrator maintains an idle code count of identified idle codes. A threshold detector compares the idle code count to a threshold value. When the idle code count exceeds the threshold value, the threshold detector generates a control signal that may be used to disable an echo canceler. The idle code count may be incremented for each idle code identified and decremented for each non-idle code identified. Different weight factors may be implemented for the increment and decrement operations.

The present invention provides various technical advantages over conventional echo cancelers. For example, one technical advantage is the disablement of an echo canceler only when an idle code count has exceeded a threshold value. Another technical advantage is in preventing false idle code detection during non-idle operations. Other technical advantages may be readily apparent to those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 1 illustrates a simplified block diagram of an echo canceler;

FIG. 2 illustrates a simplified block diagram of an idle code density detector within the echo canceler.

DETAILED DESCRIPTION OF THE INVENTION

FIG. 1 is a block diagram of an echo canceler 10. Echo canceler 10 includes an idle code density detector 12, an adaptive filter 14, a combiner 16, and a processor 18. Idle code density detector 12 receives the initial voice frequency signals over input line 20. Idle code density detector 12 identifies idle codes and non-idle codes on input line 20. In response to identification of idle codes and non-idle codes, idle code density detector 12 generates a control signal 22. Control signal 22 may be used to disable adaptive filter 14 and processor 18 in order to halt the echo canceling function of echo canceler 10.

During echo canceling operation, adaptive filter 14 receives initial voice frequency signals over an input line 20 in response to origination of a call. Adaptive filter 14 performs a mapping function on the initial voice frequency signals. Adaptive filter 14 provides the mapped initial voice frequency signals to combiner 16. Combiner 16 receives responsive voice frequency signals on a return line 24 that includes an echo of the initial voice frequency signals. Combiner 16 uses the mapped initial voice frequency signals from adaptive filter 16 to eliminate the echo of the initial voice frequency signals from the response voice frequency signals on return line 24. Processor 18, which may be a non-linear processor, removes residual low level echo from the response voice frequency signals provided by combiner 16 prior to transfer to the origination of the call.

Idle codes, which typically indicate an on-hook condition, may have the form of hexadecimal 7F and/or FF. Quiet line codes, or non-idle codes, indicate an off-hook condition but without any voice frequency energy present. Non-idle codes may have the form of hexadecimal 7E and/or FE. Idle codes may be interspersed with the non-idle codes during this off-hook condition without the presence of voice frequency energy. Idle code density detector 12 prevents disablement of adaptive filter 14 and processor 18 by ensuring that idle codes identified during off-hook conditions do not trigger a disable signal for adaptive filter 14 and processor 18.

FIG. 2 is a block diagram of idle code density detector 12. Idle code density detector 12 includes an idle code detector 30, an idle code integrator 32, and a threshold detector 34. Idle code detector 30 identifies idle codes and non-idle codes present on input line 20. Idle code integrator 32 maintains an idle code count 36 in response to idle codes and non-idle codes identified by idle code detector 30. Idle code integrator 32 increments the idle code count 36 by a first weight factor 38 for each idle code identified by idle code detector 30. Idle code integrator 32 decrements the idle code count 36 by a second weight factor 40 for each non-idle code identified by idle code detector 30. To prevent detection of false idle codes, the second weight factor 40 is greater than the first weight factor 38. For an example of weight factors to ensure proper operation, the first weight factor 38 may have a value of one and the second weight factor 40 may have a value of ten. Other weight factor values may also be used with equal effectiveness. Threshold detector 34 compares the idle code count 36 to a threshold value 42 at a comparator 44. When the idle code count 36 exceeds the threshold value 42, threshold detector 34 generates control signal 22 to disable adaptive filter 14 and indicate to processor 18 that input line 20 is in an idle on-hook state. Idle code integrator 32 continues to increment and decrement throughout a duration of a call. Idle code integrator 32 may reset the idle code count 36 in response to an idle on-hook state determined by threshold detector 34 or upon initial detection of an off-hook condition on input line 20. In this manner, idle code densities over a specified time interval are measured to ensure that an on-hook condition occurs before echo canceler 10 is disabled.

Thus, it is apparent that there has been provided, in accordance with the present invention, an idle code density detector that satisfies the advantages set forth above. Although the present invention has been described in detail, it should be understood that various changes, substitutions, and alterations may be readily ascertainable by those skilled in the art may be made herein without departing from the spirit and scope of the present invention as defined by the following claims.

What is claimed is:

1. An idle code density detector, comprising:

an idle code detector operable to identify idle codes on an input line;

an idle code integrator operable to maintain an idle code count of idle codes identified by the idle code detector; and a threshold detector operable to compare the idle code count to a threshold value, the threshold detector operable to generate a control signal in response the idle code count exceeding the threshold value, wherein the idle code integrator resets the idle code count after a full duration of a time interval, wherein the time interval occurs from an indication of an off-hook condition on the input line to an indication of an on-hook condition on the input line.

2. An idle code density detector, comprising:

an idle code detector operable to identify idle codes on an input line;

an idle code integrator operable to maintain an idle code count of idle codes identified by the idle code detector; and a threshold detector operable to compare the idle code count to a threshold value, the threshold detector operable to generate a control signal in response the idle code count exceeding the threshold value, wherein the idle code detector is operable to identify non-idle codes on the input line, the idle code integrator operable to increment the idle code count for each idle code identified by the idle code detector, the idle code integrator operable to decrement the idle code count for each non-idle code identified by the idle code detector.

3. The idle code density detector of claim 2, wherein the idle code integrator is operable to increment the idle code count by a first weight factor in response to idle code identification by the idle code detector, the idle code integrator further operable to decrement the idle code count by a second weight factor in response to non-idle code identification by the idle code detector.

4. The idle code density detector of claim 3, wherein the second weight factor is greater than the first weight factor.

5. The idle code density detector of claim 4, wherein the first weight factor has a value of 1 and the second weight factor has a value of 10.

6. An echo canceler, comprising:

an idle code detector operable to identify idle codes on an input line;

an idle code integrator operable to maintain a count of identified idle codes;

a threshold detector operable to compare the count to a threshold level;

an adaptive filter operable to eliminate echo from the input line, the threshold detector operable to disable the adaptive filter in response to the count exceeding the threshold level;

a processor operable to eliminate residual echo from the input line, the threshold detector operable to provide an indication to the processor that the adaptive filter has been disabled.

7. The echo canceler of claim 6, wherein the idle code detector is operable to identify non-idle codes, the idle code integrator operable to increment the count for each idle code identified by the idle code detector, the idle code integrator operable to decrement the count for each non-idle code identified by the idle code detector.

8. The echo canceler of claim 7, wherein the idle code integrator is operable to increment the count by a first weight factor in response to idle code identification, the idle code integrator operable to decrement the count by a second weight factor in response to non-idle code identification.

9. The echo canceler of claim 8, wherein the second weight factor is greater than the first weight factor.

10. The echo canceler of claim 6, wherein the processor is a non-linear processor.

11. A method of detecting idle code density, comprising steps of:

identifying idle codes on an input line;

maintaining an idle code count in response to the idle codes identified on the input line;

comparing the idle code count to a threshold value;

generating a control signal in response to the idle code count exceeding the threshold value identifying non-idle codes on the input line;

maintaining the idle code count in response to the non-idle codes identified on the input line.

12. The method of claim 11, wherein the maintaining the idle code count steps includes incrementing the idle code count for each idle code identified on the input line and decrementing the idle code count for each non-idle code identified on the input line.

13. The method of claim 12, wherein the idle code count is incremented by a first weight factor and decremented by a second weight factor.

14. The method of claim 13, wherein the second weight factor is greater than the first weight factor.

15. The method of claim 14, wherein the first weight factor has a value of 1 and the second weight factor has a value of 10.

* * * * *